2,743,301

SEPARATION OF ISOMERIC NITROPHENATES

Benedict F. Melucci, Yonkers, N. Y., assignor to American Cyanamid Company, New York, N. Y., a corporation of Maine No Drawing. Application September 4, 1953,
Serial No. 378,665

5 Claims. (Cl. 260—622)

This invention relates to the separation of position isomers and more particularly to the separation of the ortho and para isomers of alkali nitrophenates.

In the past the most common method of separating ortho and para nitrophenols has been by distillation. However, separation by distillation has been subject to several shortcomings. The relatively high temperatures promote the degradation of the nitrophenates into tars. Further, not only has this operation been costly and time-consuming but one of the isomers would often be contaminated with the other along with various tars and impurities. Other methods of separation suffered from even greater deficiencies. This has been true not only when the separation was carried out on the phenols themselves, but also when the sodium salts of the phenols were utilized.

Accordingly, it is the principal object of the present invention to present a process for separating the ortho and para isomers of alkali metal nitrophenates that does not suffer from the shortcomings of the prior art processes.

Surprisingly, this object has been achieved in a strikingly simple and effective manner. A solution containing the alkali metal salts of the mixed isomers is adjusted to contain a low percentage by weight of both sodium hydroxide and sodium chloride. The solution is then maintained at a temperature in the range of about 35–55° C. In this temperature range the para isomer is substantially insoluble and precipitates out while the ortho isomer remains soluble and stays in solution. The crystalline para isomer may then be removed from the mother liquor, thus effecting an efficient separation.

The addition of the sodium chloride and the sodium hydroxide to the solution of the mixed isomers should be such that the final solution contains 7–12% of each of the sodium hydroxide and sodium chloride. It is in this range that best results are obtained. It is not essential that the sodium hydroxide and sodium chloride each be dissolved in an amount equal to the other. The relationship of the amounts of the two added compounds is not critical.

The solution is next brought to a temperature within the range of about 30–55° C. In this temperature range, the para alkali metal nitrophenate is substantially insoluble and hence precipitates. The ortho isomer, however, is very soluble and stays in solution. If the crystallization is carried out in the upper range of the stated temperatures, then there is obtained an extremely pure yield of the para isomer. If the crystallization is carried out in the lower range of temperatures, then there is obtained an extremely pure yield of the ortho isomer; this isomer remains in solution. At the upper range of temperatures, that is around 50° C., a small amount of the para isomer is left in solution, while around the lower range, that is about 35° C., the para has all precipitated out along with a very small amount of the ortho isomer. Should it be desired to obtain each of the two isomers as pure as possible, then the crystallization should be carried out in the middle of the temperature range, that is at about 40° C. At this temperature, the para isomer precipitates along with only a negligible amount of the ortho isomer while the ortho isomer remains in solution along with a negligible amount of the para isomer. Thus, depending on the use to which either of the desired isomers is to be put, it is possible to obtain the desired isomer in degrees of purity ranging from the perfectly pure isomer down to the isomer contaminated with small amounts of the unwanted isomer.

The following table illustrates the relative solubilities of the two isomers at various temperatures in the presence of 7–8% sodium hydroxide and 10% sodium chloride. There was 13% by weight of the para isomer present in solution along with 7% by weight of the ortho isomer.

| Temperature (° C.) | Approximate Solubility of Sodium Nitrophenates |
|---|---|
| 80 | All ortho salt soluble. 20% para salt soluble. |
| 55 | All ortho salt soluble. 5–8% para salt soluble. |
| 40 | All ortho salt soluble. Para salt insoluble. |
| 30 | Ortho salt starts precipitating out. |
| 0 | Both ortho and para salts insoluble. |

When crystallization is complete the crystalline para isomer may be removed by any well-known means, such as filtration. The crystals may then be washed with 20% caustic soda solution to remove all mother liquor and any tars formed by degradation of the products. Drying the product may be carried out in any of the well-known methods, if desired.

The ortho isomer remaining in the mother liquor may be easily salted out by adding sufficient alkali metal chloride to raise the alkali metal chloride content to about 25% by weight. The solution may be kept warm to prevent any inorganic salts from crystallizing out. Substantially pure ortho isomer may then be recovered by centrifuging the resultant slurry.

The alkali metal salt of the ortho and para isomers of nitrophenol may be readily converted to the phenol, if desired, by acidification. Both the alkali metal salts and the phenols themselves are useful intermediates in the synthesis of other compounds. For instance, para nitrophenol or sodium p-nitrophenate is widely used in the preparation of the O,O-dialkyl O-p-nitrophenol thiophosphate esters. These esters are exceedingly effective insecticides. The ortho isomer is widely used as a leather preservative.

The following example will serve to illustrate the principles of the present invention:

To a solution containing 450 pounds of sodium para nitrophenate, 241 pounds of sodium ortho nitrophenate, 2,188 pounds of water and 30 pounds of impurities is added 345 pounds of sodium chloride and 380 pounds of sodium hydroxide. The solution is brought to a temperature of 50° C. and is held there until a test of the mother liquor shows the substantial absence of the para isomer; the time held at 50° C. was about five minutes. The para salt is then removed by filtering in a vacuum pan filter with a stainless steel screen and washed with 20% caustic soda solution. After drying, the filtered product was found to be pure sodium para nitrophenate; no detectable amount of the ortho isomer was present.

The mother liquor from the above filtration was treated with 450 pounds of sodium chloride crystals. This resulted in precipitation of the sodium ortho nitrophenate as red crystals which, after centrifuging, were contaminated with a small amount of sodium para nitrophenate.

I claim:

1. The method for the separation of the ortho and para isomers of alkali metal nitrophenates which comprises:

adjusting an aqueous solution consisting essentially of a mixture of ortho and para alkali metal nitrophenates to a concentration of about 7–12% sodium hydroxide and about 7–12% sodium chloride by the addition of said sodium hydroxide and sodium chloride thereto; bringing said solution to a temperature in the range of about 30°–55° C. thereby effecting the precipitation of the relatively insoluble para isomer from the relatively soluble ortho isomer in solution; and separating the para isomer from the ortho isomer in said solution.

2. The method according to claim 1 in which said alkali metal is sodium.

3. The method according to claim 1 in which said temperature is 50° C.

4. The method according to claim 1 in which said sodium hydroxide is adjusted to a concentration of about 10.5% and said sodium chloride is adjusted to a concentration of about 9.5%.

5. The method for the separation of the ortho and para isomers of sodium nitrophenates which comprises: adjusting an aqueous solution consisting essentially of a mixture of ortho and para sodium nitrophenates to a concentration of about 10.5% sodium hydroxide and about 9.5% sodium chloride by the addition of said sodium hydroxide and sodium chloride thereto; bringing said solution to a temperature of about 50° C. thereby effecting the precipitation of relatively insoluble para sodium nitrophenate from the relatively soluble ortho sodium nitrophenate in solution; and separating the para isomer from the ortho isomer in said solution.

References Cited in the file of this patent

UNITED STATES PATENTS 2,245,945    Van Dijck et al. _____ June 17, 1941